(12) United States Patent
Coates (10) Patent No.: US 9,487,226 B2
(45) Date of Patent: Nov. 8, 2016

(54) CONTAINER SYSTEM FOR TRANSPORTING ONE OR MORE OBJECTS BY PULLING A ROPE

(71) Applicant: Micheal Coates, Clayton, NC (US)

(72) Inventor: Micheal Coates, Clayton, NC (US)

( * ) Notice: Subject to any disclaimer, the term of this patent is extended or adjusted under 35 U.S.C. 154(b) by 0 days.

(21) Appl. No.: 14/987,629

(22) Filed: Jan. 4, 2016

(65) Prior Publication Data
US 2016/0194020 A1 Jul. 7, 2016

Related U.S. Application Data (60) Provisional application No. 62/100,101, filed on Jan. 6, 2015, provisional application No. 62/147,022, filed on Apr. 14, 2015.

(51) Int. Cl.
*B62B 17/06* (2006.01)
*B62B 13/06* (2006.01)

(52) U.S. Cl.
CPC ............. *B62B 13/06* (2013.01); *B62B 17/061* (2013.01)

(58) Field of Classification Search
CPC ....... B62B 13/02; B62B 13/06; B62B 17/06; B62B 17/061
USPC .................... 280/18, 19, 28.13, 28.17, 28.18
See application file for complete search history.

(56) References Cited

U.S. PATENT DOCUMENTS

| | | | | |
|---|---|---|---|---|
| 2,365,174 A * | 12/1944 | Cochran | ................ | B62B 13/16 188/8 |
| 2,596,005 A * | 5/1952 | Barrow | ................ | B65D 25/20 220/628 |
| 3,635,490 A * | 1/1972 | Demaree | ................ | B62B 13/06 280/18 |
| 6,089,636 A * | 7/2000 | Harris | ................ | A01K 1/0236 294/150 |
| 6,641,446 B1 * | 11/2003 | Bentley | ................ | B63C 9/32 280/19 |
| 6,802,516 B2 * | 10/2004 | Schuerman | ................ | B62B 3/02 280/30 |
| 7,422,220 B2 * | 9/2008 | Walkingshaw | ........ | A61G 1/007 224/156 |
| 2005/0218611 A1 * | 10/2005 | Mehrmann | ............. | B62B 13/02 280/18 |
| 2007/0138752 A1 * | 6/2007 | Kress | ....................... | B25H 3/06 280/19 |
| 2009/0051132 A1 * | 2/2009 | Masterson | ............ | B62B 15/007 280/19 |

* cited by examiner

*Primary Examiner* — John Walters
(74) *Attorney, Agent, or Firm* — NK Patent Law, PLLC (57) ABSTRACT

Container systems for transporting one or more objects, and methods of using, are provided. The container system includes a substantially rectangular symmetrical tray for supporting the one or more objects, the tray being unitarily constructed and defining a base, two opposing longitudinal sides extending away from the base, and two opposing latitudinal sides extending away from the base. Further, the container system includes at least two runners defined by the underside of the base and extending the length of the base in the direction of the longitudinal sides. The container system further has a first rope engaged with two latitudinal first holes positioned on a first latitudinal side and a second rope engaged with two latitudinal second holes positioned on a second latitudinal side.

20 Claims, 9 Drawing Sheets

CONTAINER SYSTEM FOR TRANSPORTING ONE OR MORE OBJECTS BY PULLING A ROPE

CROSS REFERENCE TO RELATED APPLICATIONS

This application is a non-provisional of U.S. Provisional Application No. 62/100,101 filed Jan. 6, 2015 titled "CONTAINER SYSTEM FOR TRANSPORTING ONE OR MORE OBJECTS BY PULLING A ROPE", and this application is a non-provisional of U.S. Provisional Application No. 62/147,022 filed Apr. 14, 2015 titled "CONTAINER SYSTEM FOR TRANSPORTING ONE OR MORE OBJECTS BY PULLING A ROPE", each of which is herein incorporated by reference in its entirety.

TECHNICAL FIELD

The present disclosure relates to a container system for transporting one or more objects by pulling a rope.

BACKGROUND

Transporting large units or heavy equipment can be very troublesome, particularly when the transportation occurs in confined spaces and over uneven grounds. For example, installing a HVAC unit or water heater underneath a structure, such as through a crawl space of a house, often requires multiple people dragging expensive equipment and tools over the uneven ground in order to reach a desired location. Often time, a HVAC unit or water heater can become damaged after being rolled or dragged through a tight crawl space. Due to the large size and weight of many of these units, several people are needed to maneuver and position the units in an attempt to minimize any damage thereto.

There thus exists a need for a way to safely and effectively transport one or more objects over a surface to a desired location, particularly in confined spaces such as crawl spaces. Further, there exists a need for a way to transport such objects with only one or two people. Disclosed herein are one or more systems and containers that advantageously addresses these issues. The one or more systems and containers may be used for the HVAC or water heater installation example provided herein, or for use in transporting any object through rough or uneven terrain.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

According to at least one embodiment, a container system for transporting one or more objects is provided. The container system includes a substantially rectangular symmetrical tray for supporting the one or more objects, the tray being unitarily constructed and defining a base, two opposing longitudinal sides extending away from the base, and two opposing latitudinal sides extending away from the base. Further, the container system includes at least two runners defined by the underside of the base and extending the length of the base in the direction of the longitudinal sides, each runner having two opposing ends that taper towards the underside of the base. The container system has a first rope coupled to each first rope latitudinal hole positioned symmetrically on each of the latitudinal sides and a second rope coupled to each second rope latitudinal hole positioned symmetrically on each of the latitudinal sides.

According to one or more embodiments, the container system further includes two first rope base holes positioned on the base and in alignment with the first rope latitudinal holes and two second rope base holes positioned on the base and in alignment with the second rope latitudinal holes. The first rope may be extended through one of the first rope latitudinal holes, through the nearest first rope base hole, along the underside of the base, through the other first rope base hole, and through the other first rope latitudinal hole. Further, the second rope may be extended through one of the second rope latitudinal holes, through the nearest second rope base hole, along the underside of the base, through the other second rope base hole, and through the other second rope latitudinal hole.

According to one or more embodiments, at least two of the runners adjacently extend along both sides of the portion of the first rope underneath the base and at least two of the runners adjacently extend along both sides of the portion of the second rope underneath the base.

According to one or more embodiments, the container system further includes a third rope coupled to a first pull support for pulling the tray in a first direction and a fourth rope coupled to a second pull support for pulling the tray in a second direction. The first pull support may extend between, and may be coupled to, ends of the first rope and the second rope positioned outside of the tray adjacent to one of the latitudinal sides. The second pull support may extend between, and may be coupled to, ends of the first rope and the second rope positioned outside of the tray adjacent to the other latitudinal side.

According to one or more embodiments, a method for transporting one or more objects is provided. The method for transporting one or more objects includes providing a substantially rectangular symmetrical tray for supporting the one or more objects. The tray being unitarily constructed and defining a base, two opposing longitudinal sides extending away from the base, and two opposing latitudinal sides extending away from the base. The underside of the base tray further defines at least two runners extending the entire longitudinal length of the base, each runner having two ends that taper towards the underside of the base. The tray further includes a first rope coupled to each first rope latitudinal hole positioned symmetrically on each of the latitudinal sides and a second rope coupled to each second rope latitudinal hole positioned symmetrically on each of the latitudinal sides. The method for transporting one or more objects further includes placing the one or more objects in the tray, and a user simultaneously pulling a portion of both the first rope and the second rope extending through the same latitudinal side, thereby pulling the runners of the tray across a surface in a first direction.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

FIGS. 1A-1E, 3A-3B and 4A-4B depict embodiments of the container system 10 for transporting one or more objects 1 across a surface 2. For example, the container system 10 may be used to hold and transport a HVAC unit across an uneven ground through a crawl space under a structure. Additionally, the container system 10 may be used to transport various sizes and shapes of object(s) 1 across a variety of surfaces 2.

In the embodiments depicted in FIGS. 1A-1E, 3A-3B and 4A-4B the container system 10 includes a substantially rectangular symmetrical tray 12 for supporting the one or more objects 1. In alternative embodiments, the tray 12 may be shaped in sized in any number of configurations, such as a square, rectangle or an irregular shape with four sides. The tray 12 may be unitarily constructed, or may be composed of separate parts subsequently joined together. The tray 12 may be constructed of any number of materials, including plastic, and preferably high-density polyurethane (HDPE).

The tray 12 embodied in FIGS. 1A-1E, 3A-3B and 4A-4B defines a base 14, two opposing longitudinal sides 16 extending away from the base 14, and two opposing latitudinal sides 20 extending away from the base 14. The sides 16, 20 may extend away from the base 14 at a substantially perpendicular angle or the sides 16, 20 may extend away from the base 14 at more obtuse angle. In some embodiments the latitudinal sides 20 may extend away from the base 14 at a larger angle than the longitudinal sides 16. Further, in some embodiments, each of the two longitudinal sides 16, and/or each of the two latitudinal sides 20, may extend from the base 14 at differing angles. The angle of a side 16, 20 extending perpendicularly away from the base 14 is 90 degrees, whereas an angle of a side 16, 20 extending parallel and away from the base 14 is 180 degrees. An obtuse angle extends between 90 and 180 degrees away from the base 14.

In some embodiments, at least two runners 22 may be defined by the underside of the base 14 and extend the length of the base 14 in the direction of the longitudinal sides 16. Each runner 22 has two opposing ends 24 that may taper towards the underside of the base 14, the tapering of the opposing ends 24 permitting the container system 10 to more easily transport objects 1 across surfaces 2. The tapering of the opposing ends 24 may be a gradual and consistent taper, a curved taper, or some other taper. The runners 22 are preferably of solid construction, but may be hollow, or contain hollow portion(s), in order to save costs. The runners 22 enhance the ability of the tray 12 to slide over a surface 2 and more easily manage any obstacles, such as rocks or elevation changes, on the surface 2. The topside of the base 14 may be substantially flat or ribbed. A ribbed base 14 may have a contour that reflects the runners 22 underneath, such that the base has a substantially uniform thickness. A ribbed topside of the base 14 advantageously permits the object(s) 1 to remain in a more fixed position within the tray 12 during transport. In one embodiment, the runners 22 do not extend above the base, so that the flatness or ribs on the topside of the base are unaffected in shape by the runners 22.

Further, the tray 12 of the container system 10 may include two latitudinal holes 26, 27 positioned symmetrically on each of the two latitudinal sides 20. In alternative embodiments, the latitudinal holes 26, 27 are positioned asymmetrically on each of the two latitudinal sides 20. In yet another embodiment, two latitudinal holes 26 may be positioned on one latitudinal side 20, either symmetrically or asymmetrically, and two latitudinal holes 27 may be positioned on the opposing latitudinal side 20, either symmetrically or asymmetrically. A first rope 30 may be coupled to each first rope latitudinal hole 26 positioned and a second rope 32 may be coupled to each second rope latitudinal hole 27. At least one embodiment is depicted in FIGS. 1A-1E and at least another embodiment is depicted in FIGS. 4A and 4B.

As depicted in FIGS. 1A-1E, the first and second ropes 30, 32 may each extend through the latitudinal holes 26, 27, respectively. Alternatively, the first and second ropes 30, 32 may be coupled to each of their respective latitudinal holes 26, 27. The coupling of the ropes 30, 32 may be accomplished by ensuring the ropes 30, 32 cannot be pulled through the hole (e.g., a knot) or by affixing the ropes 30, 32 to the latitudinal holes 26, 27 or a circular ring 56 of the latitudinal holes 26, 27. In alternative embodiments, each of the latitudinal holes 26, 27 may be reinforced with a circular ring 56 for adding structural support to the latitudinal holes 26, 27 when the container system 10 is in use.

In one or more embodiments, as depicted in FIGS. 1A-1E, the container system 10 may further include two first rope base holes 62 positioned on the base 14 and in alignment with the first rope latitudinal holes 26 and two second rope base holes 64 positioned on the base 14 and in alignment with the second rope latitudinal holes 27. The first rope 30 may extend through one of the first rope latitudinal holes 26, through the nearest first rope base hole 62, along the underside of the base 14, through the other first rope base hole 62, and through the other first rope latitudinal hole 26. The second rope 32 may extend through one of the second rope latitudinal holes 27, through the nearest second rope base hole 64, along the underside of the base 14, through the other second rope base hole 64, and through the other second rope latitudinal hole 27.

Figure 4A:
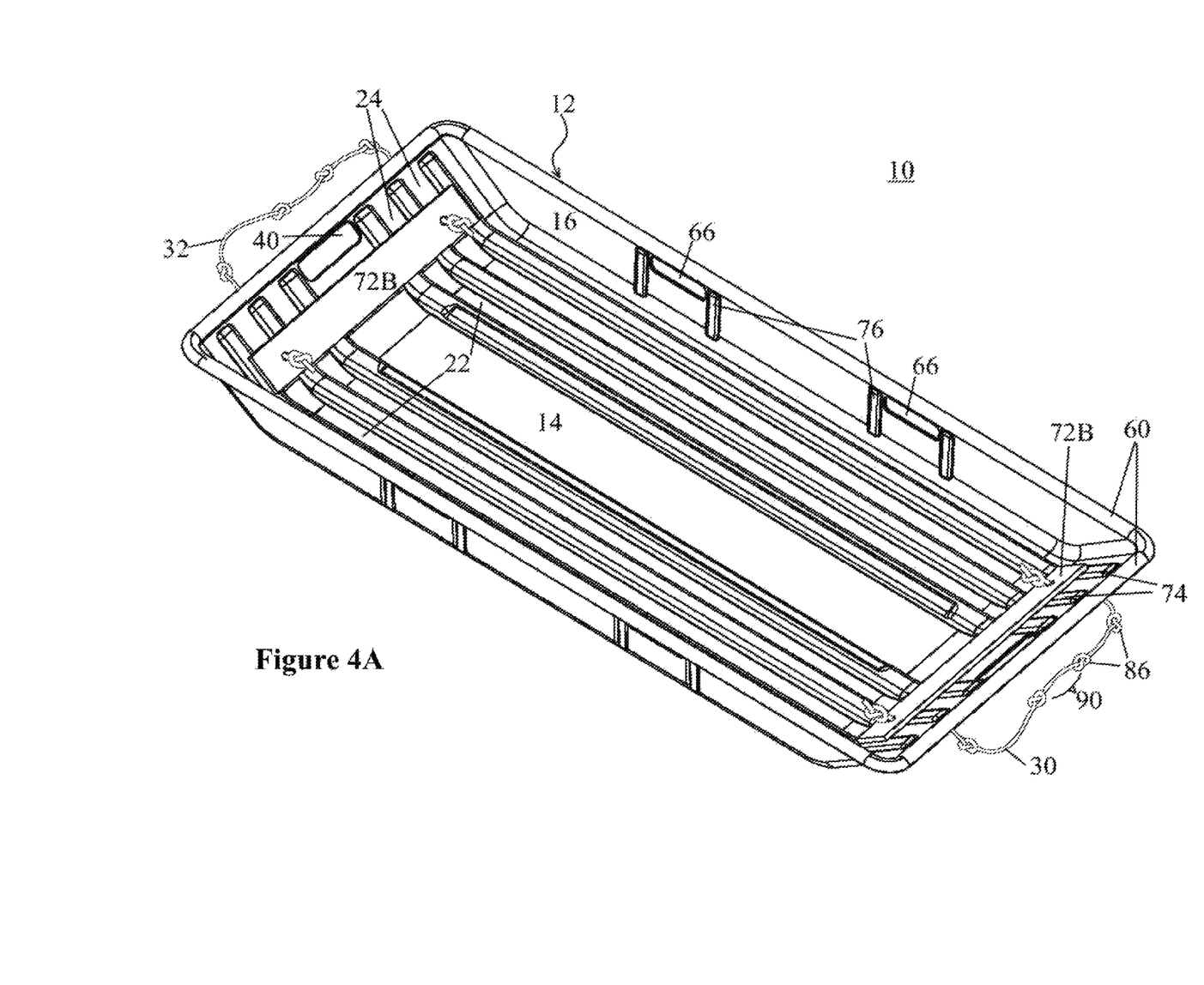
FIG. 4A is an overhead view of the container system according to one or more embodiments disclosed herein.
Figure 4B:
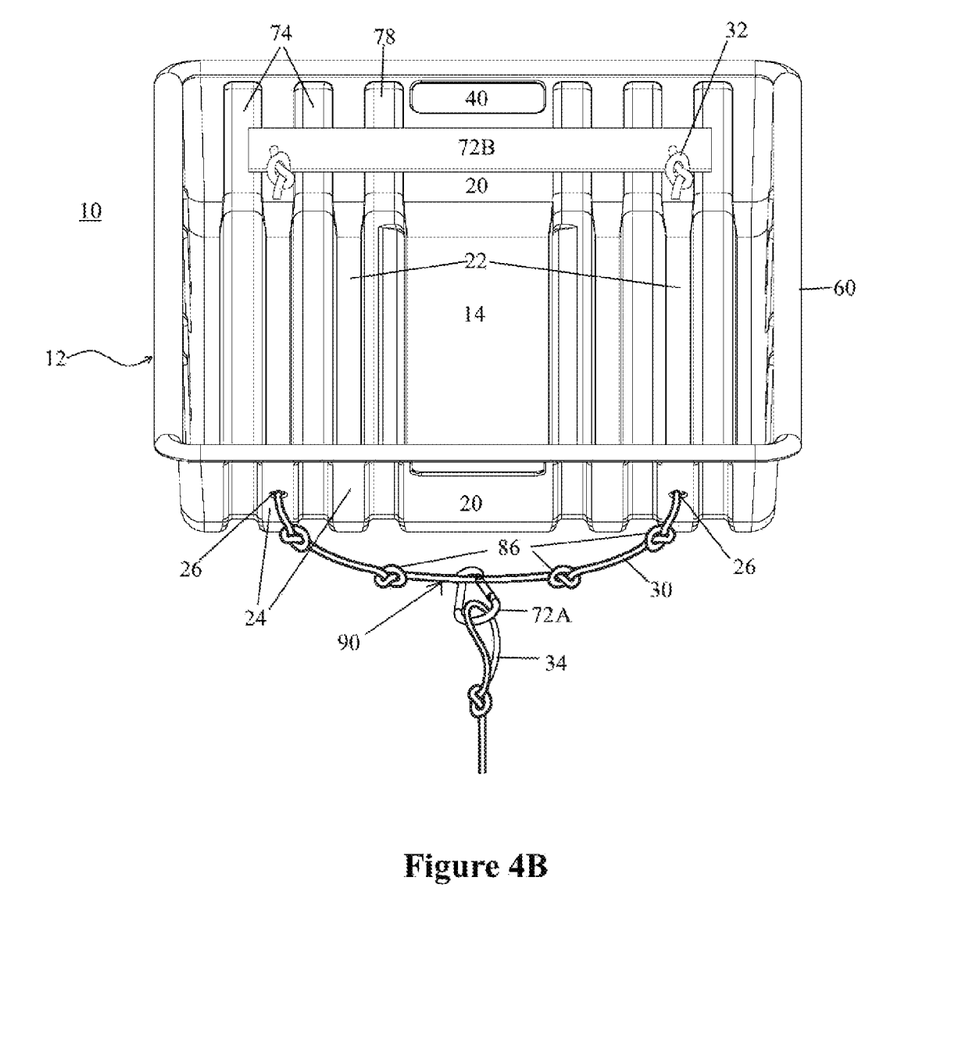
FIG. 4B is a front view of the container system according to one or more embodiments disclosed herein.

In some embodiments, as depicted in FIGS. 4A and 4B, a first rope 30 may extend through, or be coupled to, the latitudinal holes 26 of a first latitudinal side 20. Further, a second rope 32 may extend through, or be coupled to, the latitudinal holes 27 of a second latitudinal side 20. As described herein, various ring(s) 56, pull support(s) 72 and/or pull support portion(s) 84 may be used in conjunction with the ropes 30, 32.

In additional embodiments, the longitudinal sides 16 may include holes 62 for receiving rope(s) 30 for maneuvering the tray 12. The longitudinal sides 16 may have similar configurations as described herein for the latitudinal sides 20, such that the tray 12 may be maneuvered by pulling the ropes of the longitudinal sides, whether alone, or in addition to the ropes of the latitudinal sides. For example, but not limited thereto, a longitudinal side 16 may include four holes, with a first rope engaged with two of the holes and having a pull support 72, and a second rope engaged with the other two holes and having an additional pull support 72.

In one or more embodiments, at least two of the runners 22 of the container system 10 may adjacently extend along both sides of the portion of the first rope 30 underneath the base 14 and at least two of the runners 22 adjacently extend along both sides of the portion of the second rope 32 underneath the base 14.

Figure 1A:
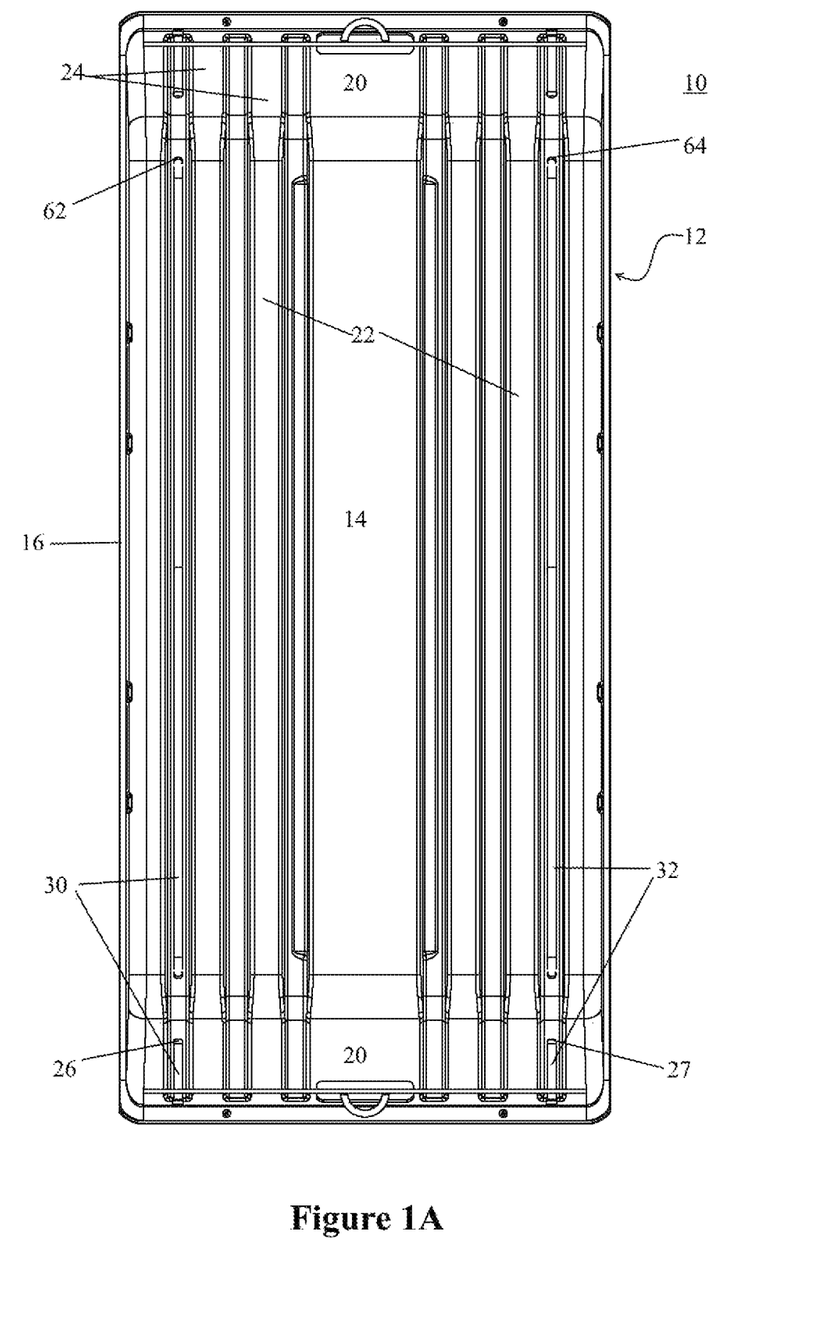
FIG. 1A is a bottom view of the container system according to one or more embodiments disclosed herein.
Figure 1B:
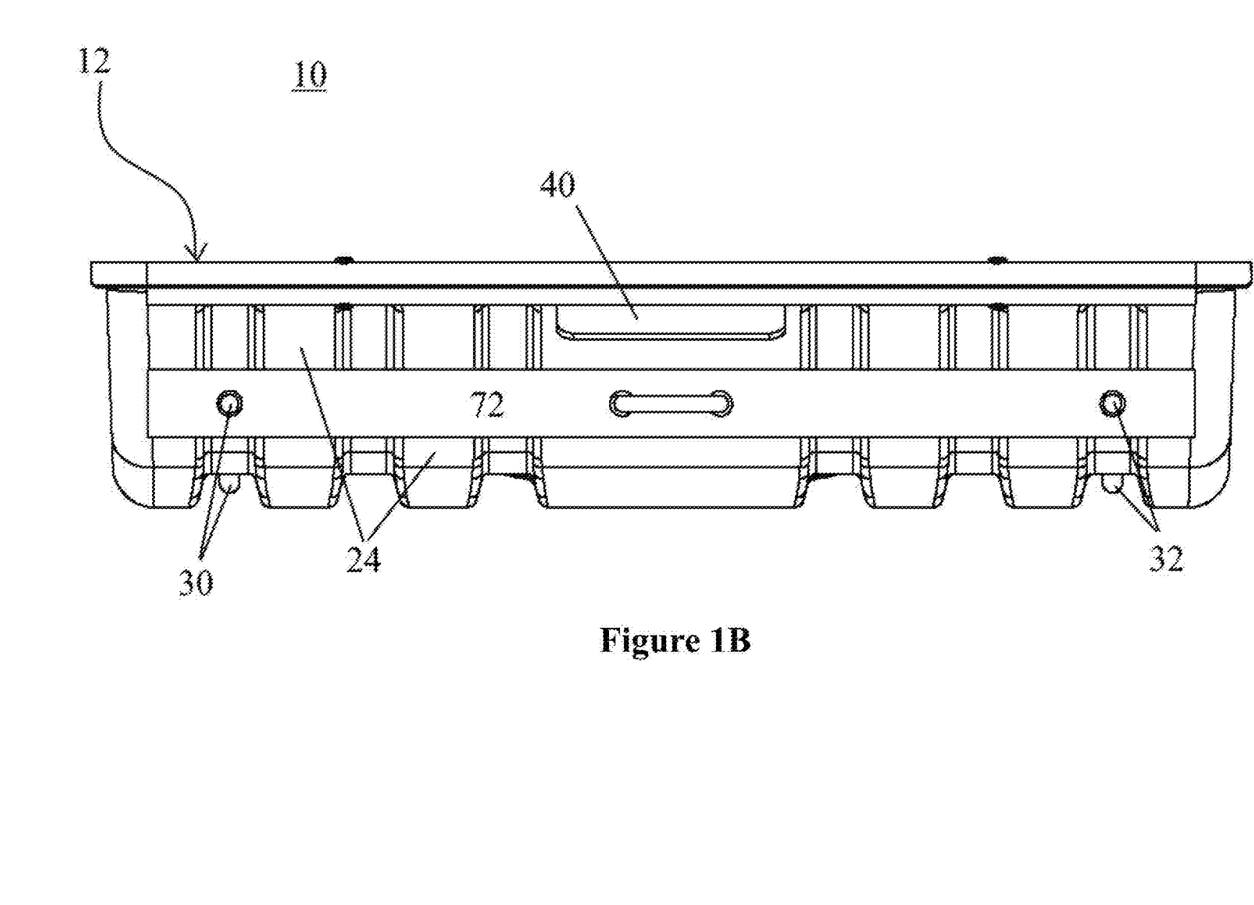
FIG. 1B is a front view of the container system according to one or more embodiments disclosed herein.
Figure 1C:
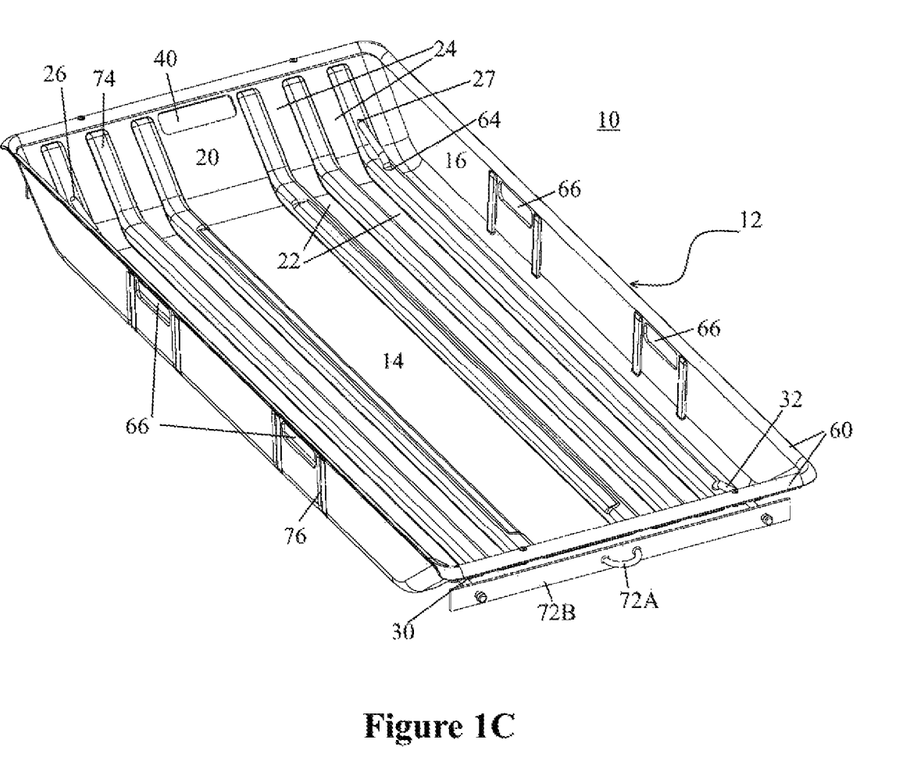
FIG. 1C is a perspective view of the container system according to one or more embodiments disclosed herein.
Figure 1D:
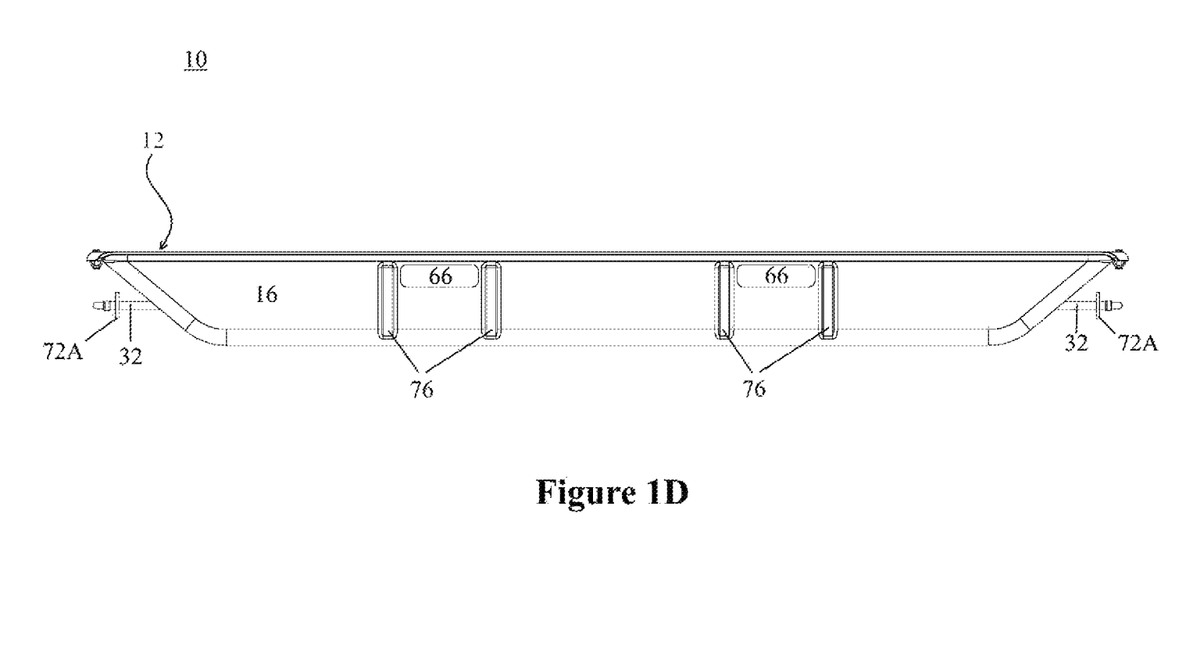
FIG. 1D is a side view of the container system according to one or more embodiments disclosed herein.
Figure 1E:
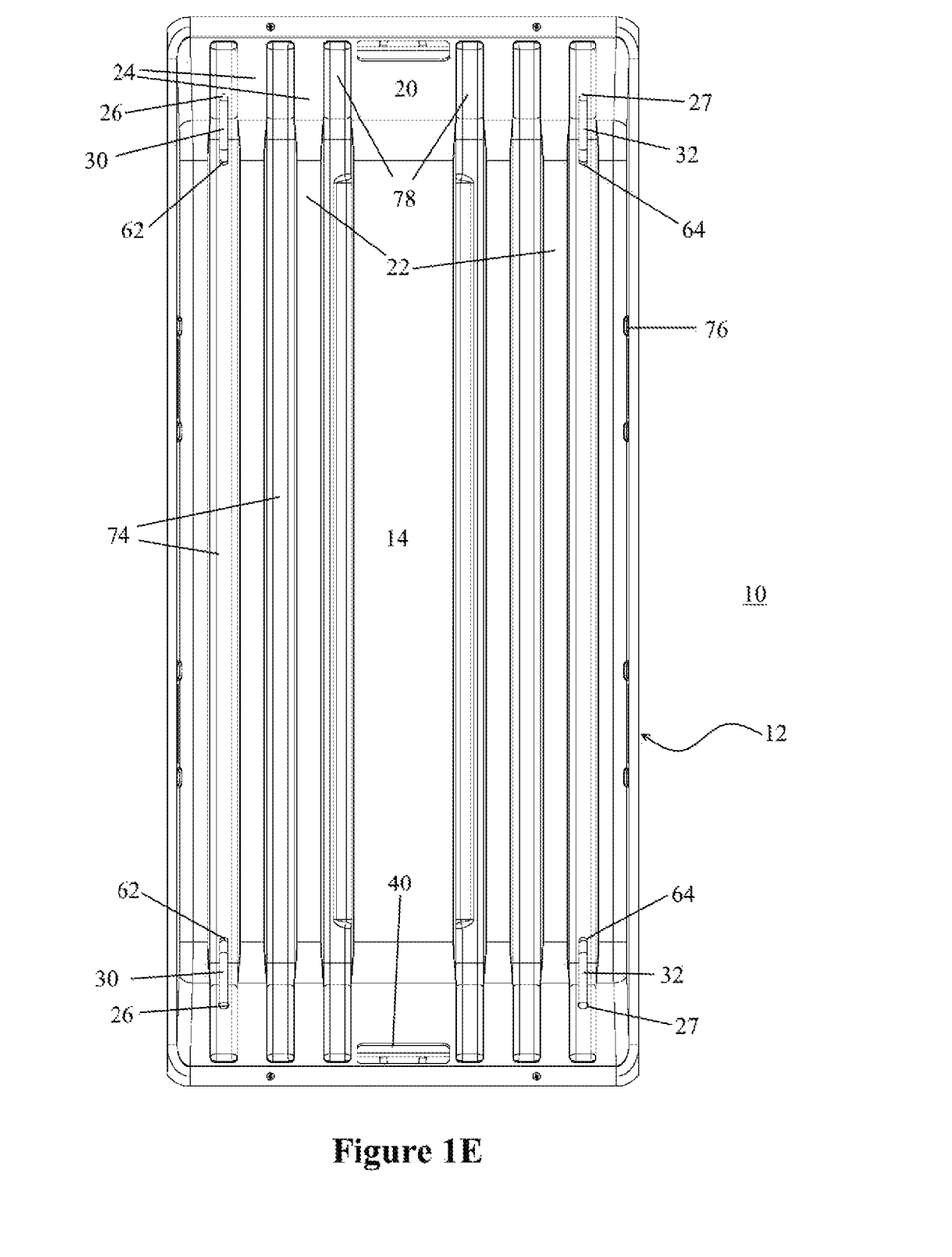
FIG. 1E is a top view of the container system according to one or more embodiments disclosed herein.
Figure 2A:
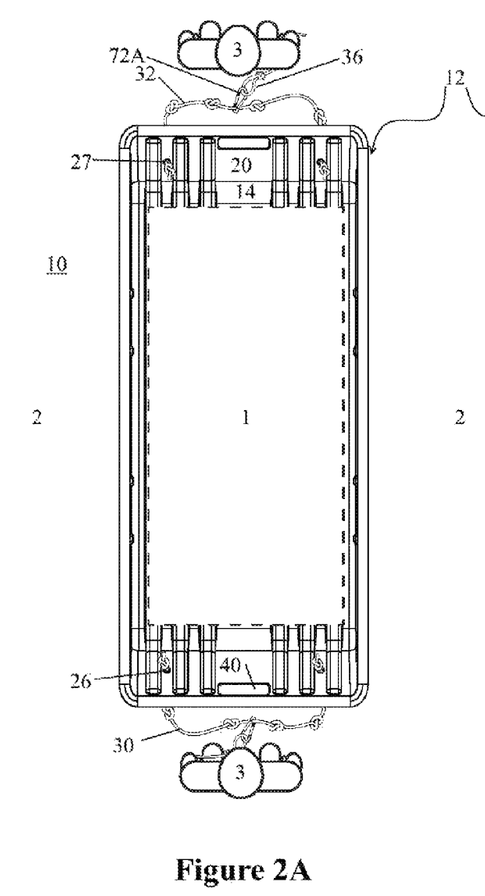
FIG. 2A is an overhead view of the container system being pulled in a first direction according to one or more embodiments disclosed herein.
Figure 2B:
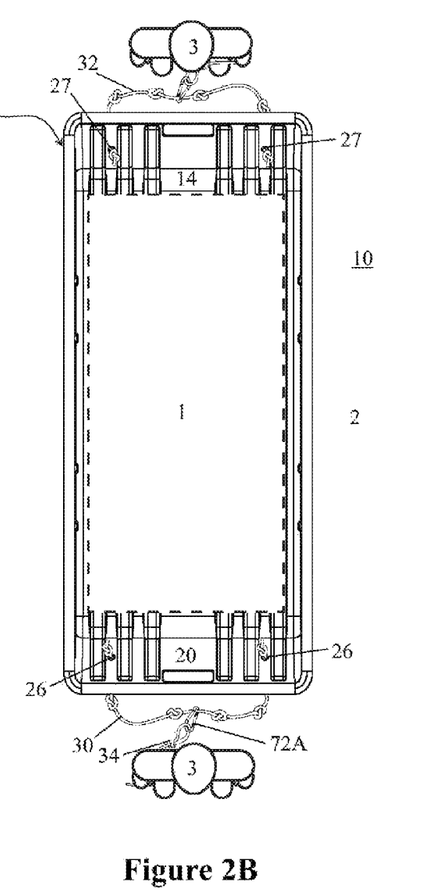
FIG. 2B is an overhead view of the container system being pulled in a second direction according to one or more embodiments disclosed herein.

In one or more embodiments, the container system 10 may include a third rope 34 coupled to a pull support 72 for pulling the tray 12 in a first direction D1 and a fourth rope 36 coupled to the pull support 72 for pulling the tray 12 in a second direction D2. FIGS. 2A and 2B show an embodiment where the container system 10 is being pulled in a first direction D1 (FIG. 2A) and a second direction D2 (FIG. 2B). Notably, the ropes 30, 32, 34, 36 may be constructed of any material suitable for pulling the container system 10, such as nylon or metal.

In one or more embodiments, the pull support 72 extends between, and is coupled to, ends of the first rope 30 and the second rope 32 positioned outside of the tray 12 adjacent to one of the latitudinal sides 20. Another pull support 72 may extend between, and is coupled to, ends of the first rope 30 and the second rope 32 positioned outside of the tray 12 adjacent to the other latitudinal side 20. In alternative embodiments, the pull support 72 may include a hook and ring for selectively engaging, for example, but not limited thereto, a third rope 34 to a first rope 30. Such an embodiment may be used with the container systems 10 embodied in FIG. 4A or 4B. Further, in some embodiments, the pull support 72 may include both connecting pull support 72A for engaging two ropes 30, 32, 34, 36 and an bridging pull support 72B between the latitudinal holes 26, 27 for enhanced support of the ropes 30, 32 during pulling. In yet another embodiment, no pull support 72 is provided; instead the third rope 34, for example, may be connected to the first rope 30 using a knot (see FIG. 3B).

In other embodiments, as depicted in FIGS. 1A-1E and 3A-3B, the container system 10 may include at least one latitudinal handle 40 defined by at least one of the latitudinal sides 20. The latitudinal handle(s) 40 may be constructed to withstand pulling forces sufficient to allow the object(s) 1 to be transported by the container system 10 by pulling the latitudinal handle(s) 40 in a first direction D1 or a second direction D2. Alternatively, the container system 10 may include at least one handle receptacle 44 defined by one of the latitudinal sides 20 for receiving a handle insert 50. The insert 50 may be any number of elongate objects, including a PVC pipe or a metal bar, the receptacle(s) 44 being configured to house the insert 50 in order to allow a user 3 to pull the container system 10 in either a first direction D1 or a second direction D2. Alternatively, the container system may include at least two latitudinal supports 74 defined by each of the latitudinal sides 20 for providing support to each of the latitudinal handles 40.

In other embodiments, as depicted in FIGS. 1A-1E, the container system 10 may include at least one longitudinal handle 66 defined by at least one of the longitudinal sides 16. The longitudinal handle(s) 66 may be constructed to withstand pulling forces sufficient to allow the object(s) 1 to be transported by the container system 10 by pulling the longitudinal handle(s) 66 in a third direction D3 or a fourth direction D4. Alternatively, the container system 10 may include at least one handle receptacle 44 defined by one of the longitudinal sides 20 for receiving a handle insert 50. The insert 50 may be any number of elongate objects, including a PVC pipe or a metal bar, the receptacle(s) 44 being configured to house the insert 50 in order to allow a user 3 to pull the container system 10 in either a third direction D3 or a fourth direction D4. Alternatively, the container system may include at least two longitudinal supports 76 defined by each of the longitudinal sides 20 for providing support to each of the longitudinal handles 66.

For example, but not limited thereto, the container system 10 may include two longitudinal handle supports 76 positioned proximally on either side of a longitudinal handle 66, extending from the base 14 to the rounded rail 60 of the edge of the longitudinal side 20 located furthest from the base 14. Similarly, latitudinal handle supports 78 may be positioned proximally on either side of a latitudinal handle 40. A plurality of latitudinal handle supports 78 may also be positioned along the latitudinal side 20. For example, but not limited thereto, latitudinal handle supports 78 may extend from an end of each runner 22 from the tapering of the runner 22 at the base 14 to the rounded rail 60.

In one or more embodiments, the container system 10 may include rounded rails 60 defined by the edge of the longitudinal sides 16 and the latitudinal sides 20 located furthest from the base 14. The rounded rails 60 add structural support to the sides 16, 20 and the container system 10 as a whole, such that the sides 16, 20 are less likely to buckle when loading, unloading and transporting objects 1.

The container system 10 may also include a drain outlet 54 for draining liquids from the tray 12. The drain outlet 54 may be reinforced with a drain ring 58 for adding structural support. The drain outlet 54 may be particularly useful when transporting a HVAC unit or water heater for permanent installation in a building. By including a drain outlet 54 within the container system 10, the HVAC or water heater may be transported using the container system 10, then can be left with the permanent installation, acting as a drip tray using the drain outlet 54.

FIGS. 2A and 2B are overhead views of the container system 10 being pulled in a first direction D1 and a second direction D2, respectively, according to one or more embodiments disclosed herein. A method for transporting one or more objects 1 using the container system 10 involves providing a substantially rectangular symmetrical tray 12 for supporting the one or more objects 1. The tray 12 may be unitarily constructed and define a base 14, two opposing longitudinal sides 16 extending away from the base 14, and two opposing latitudinal sides 20 extending away from the base 14. The underside of the base may further define at least two runners 22 extending the entire length of the longitudinal sides 16 of the base 14, each runner having two opposing ends 24 that taper towards the underside of the base 14. Additionally, the tray 12 further includes a first rope 30 coupled to each first rope latitudinal hole 26 positioned symmetrically on each of the latitudinal sides 20 and a second rope 32 coupled to each second rope latitudinal hole 27 positioned symmetrically on each of the latitudinal sides 20.

The method for transporting one or more objects 1 using the container system 10 may then include placing the one or more objects 1 in the tray 12 in preparation for transport. The base 14 of the tray 12 may be ribbed or the object(s) may be further secured using straps or ropes, in order to ensure that the object(s) remain within the container system 10 during transport. A user 3 may simultaneously pull a portion of both the first rope 30 and the second rope 32 extending through the same latitudinal side 20, thereby pulling the runners 22 of the tray 12 across a surface 2 in a first direction D1.

In one or more embodiments, the tray 12 further includes a third rope 34 coupled to a pull support 72 for pulling the tray 12 across the surface 2 in the first direction D1. The pull support 72 may be a connective pull support 72A or a bridging pull support 72B. The pull support 72 may extend between, and be coupled to, ends of the first rope 30 and the second rope 32 positioned outside of the tray 12 adjacent to one of the latitudinal sides 20.

In one or more embodiments, the method further includes a user 3 simultaneously pulling a portion of both the first rope 30 and the second rope 32 extending through the same other latitudinal side 32, thereby pulling the runners 22 of the tray 14 across the surface 2 in a second direction D2.

In one or more embodiments, the tray 12 further includes a fourth rope 36 coupled to a pull support 72 for pulling the tray 12 across the surface 2 in the second direction D2. The pull support 72 may be a connective pull support 72A or a bridging pull support 72B. For example, the bridging pull support 72B may extend between, and is coupled to, ends of the first rope 30 and the second rope 32. Alternatively, the bridging pull support 72B may be a pull support 72 extending between, and couple to, ends of the first rope 30, positioned underneath a latitudinal handle 40, either interior to or exterior to the latitudinal side 20. Further, connective pull support 72A may be a selective engagement between a third rope 34 and a first rope 30, for example, or between a fourth rope 36 and a second rope 32. In some embodiments the selective engagement of the pull support 72A may be a hook and ring. In some embodiments, a pull support 72 may be positioned inside or outside of the tray 12, along any latitudinal side 20 or longitudinal side 16. In other embodiments, more than one pull support 72 may be provided. Two pull supports 72 may be positioned on both the inside and outside of the same side 16, 20. Further, any pull support 72 may be further supported by additional pull support portions 84. The pull support 72, or pull support portion 84, may be constructed of plastic, metal, or a combination of the two, and having varying lengths, widths and thicknesses.

In at least one embodiment, the tray 12 may be 33-36 inches wide on each of the latitudinal side 20, 79-82 inches long on each of the longitudinal sides, and 6-9 inches deep throughout. Further, the latitudinal handle 40 located on each latitudinal side 20, and the two longitudinal handles 66 on each longitudinal side 16 may be 5-7 inches wide and 1-3 inches in height. The centers of the two longitudinal handles 66 on each longitudinal side 16 may be spaced 25-27 inches apart. The centers of the first rope latitudinal hole 26 and the second rope latitudinal hole 27 on each of the latitudinal sides 20 may be spaced 20-22 inches apart.

As may be envisioned, embodiments of the container system 10 disclosed herein may be used in a varying ways, such that an object 1 may be transported to a desired location. For example, after loading and securing the object 1 into the tray 12, one or more users may position the ropes 30, 32, 34, 36 through the crawl space of a house in order to begin moving the tray 12 in various directions. In some cases it may not be possible to move the tray 12 in only two directions, but may require several repositioning of the ropes 30, 32, 34, 36, such that the tray 12 is being pulled in differing directions in order to maneuver both surface 2 obstacles and other obstacles.

Figure 3A:
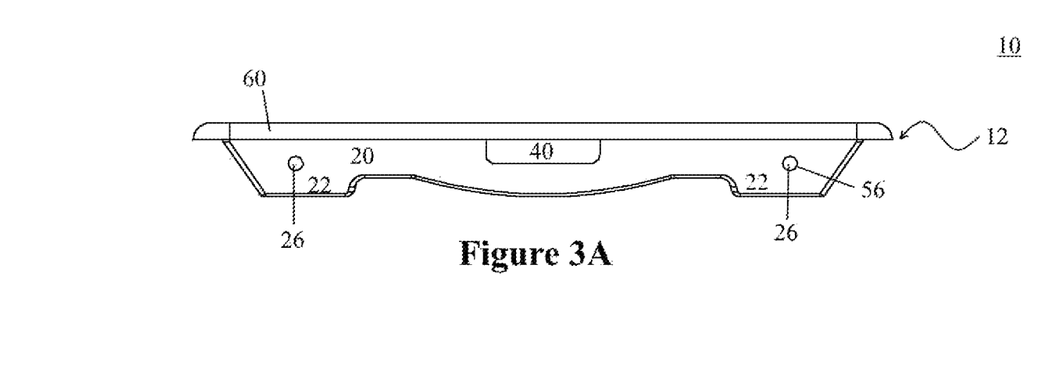
FIG. 3A is a side view of the container system according to one or more embodiments disclosed herein.
Figure 3B:
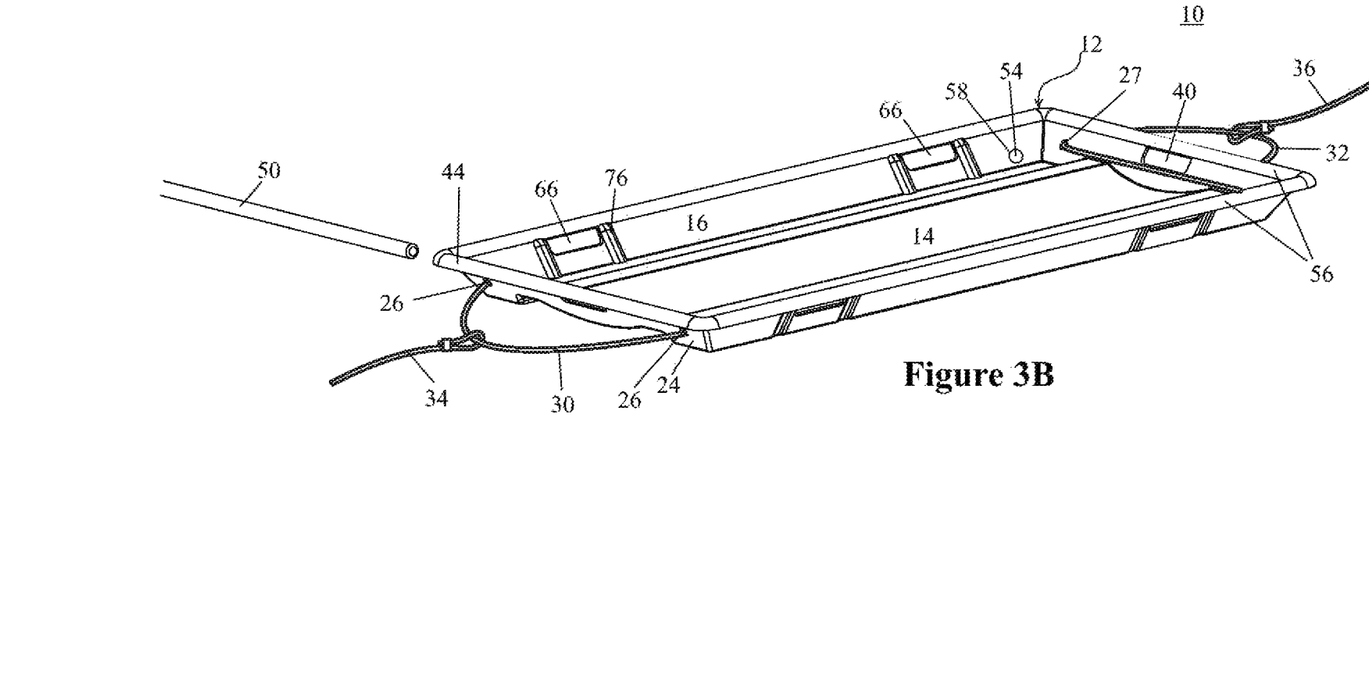
FIG. 3B is a perspective view of the container system according to one or more embodiments disclosed herein.

In one or more embodiments, as depicted in FIGS. 3B and/or 4A-4B, a first rope 30 may extend between two first rope latitudinal holes 26 of one latitudinal side 20 and a second rope 32 may extend between two second rope latitudinal holes 26 and the other latitudinal side 20. Further, the pull supports 72 of these embodiments may be positioned on the inside of the tray 12 adjacent to each of the latitudinal sides 20. In alternative embodiments, the pull support may be integral to the latitudinal side 20, without be a separate element attached thereto. In another alternative embodiment, the pull supports 72 may include two separate and distinct pull supports, one for connecting 72A, and one for bridging 72B (see FIG. 4B). Lastly, the ropes 30, 32 may include notching 86 to ensure that any coupling with the third or fourth pull ropes 34, 36 will remain positioned within an acceptable pull area 90.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A container system for transporting one or more objects across a surface comprising:
   a unitarily constructed tray for supporting the one or more objects defining:
      a base;
      two opposing longitudinal sides extending away from the base;
      two opposing latitudinal sides extending away from the base;
      at least two runners extending along the base in the direction of the longitudinal sides;
      at least one longitudinal handle defined by each of the longitudinal sides;
      at least two longitudinal supports defined by each of the longitudinal sides, positioned proximally to the at least one longitudinal handle, and extending away from the base for providing longitudinal support;

a first rope engaged with two latitudinal first holes positioned on a first latitudinal side;

a second rope engaged with two latitudinal second holes positioned on a second latitudinal side;

a first pull support positioned inside of the first latitudinal side and extending between, and engaged with, ends of the first rope;

a second pull support positioned inside of the second latitudinal side and extending between, and engaged with, ends of the second rope.

2. The system of claim 1, further comprising at least one latitudinal handle defined by each of the latitudinal sides.

3. The system of claim 2, further comprising at least two latitudinal supports defined by each of the latitudinal sides and extending away from the base for providing latitudinal support.

4. The system of claim 3, wherein each of the latitudinal supports extends from an end of a respective runner, wherein each runner has two ends that each taper towards a latitudinal side.

5. The system of claim 1, further comprising a drain outlet for draining liquids from the tray.

6. The system of claim 1, wherein an edge of the longitudinal sides and the latitudinal sides located furthest from the base each defines a rounded rail for providing additional support.

7. The system of claim 1, wherein each of the latitudinal first holes and the latitudinal second holes is reinforced with a circular ring.

8. The system of claim 1, wherein the base is substantially flat or ribbed.

9. A method for transporting one or more objects, comprising:

placing the one or more objects in a unitarily constructed tray for supporting the one or more objects, the tray defining:
a base;
two opposing longitudinal sides extending away from the base;
two opposing latitudinal sides extending away from the base;
at least two runners extending along the base in the direction of the longitudinal sides;
at least one longitudinal handle defined by each of the longitudinal sides;
at least two longitudinal supports defined by each of the longitudinal sides, positioned proximally to the at least one longitudinal handle, and extending away from the base for providing longitudinal support;

pulling a first rope engaged with two latitudinal first holes positioned on a first latitudinal side for transporting the one or more objects in a first direction, wherein each end of the first rope is engaged with a first pull support positioned internally of the first latitudinal side for providing support.

10. The method of claim 9, wherein a third rope is engaged with the first rope for transporting the one or more objects in the first direction.

11. The method of claim 9, further comprising pulling a second rope engaged with two latitudinal first holes positioned on a second latitudinal side for transporting the one or more objects in a second direction.

12. The method of claim 11, wherein each end of the second rope is engaged with a second pull support positioned internally of the second latitudinal side for providing support.

13. The method of claim 11, wherein a fourth rope is engaged with the second rope for transporting the one or more objects in the second direction.

14. A container system for transporting one or more objects across a surface comprising:

a unitarily constructed tray for supporting the one or more objects defining:
a base;
two opposing longitudinal sides extending away from the and having a rounded rail on an edge farthest from the base;
at least two runners extending along the base in the direction of the longitudinal sides;
two opposing latitudinal sides extending away from the base and having a rounded rail on an edge farthest from the base;
wherein a first latitudinal side defines a first handle, a second latitudinal side defines a second handle, a first longitudinal side defines two longitudinal handles, and a second longitudinal side defines another two longitudinal handles;
at least two longitudinal supports defined by each of the longitudinal sides, positioned proximally to the at least one longitudinal handle, and extending away from the base for providing longitudinal support;

a first rope engaged with two latitudinal first holes positioned on the first latitudinal side, wherein the first rope is further engaged with a first pull support extending between two ends of the first rope for providing transport support;

a second rope engaged with two latitudinal second holes positioned on the second latitudinal side, wherein the second rope is further engaged with a second pull support extending between two ends of the second rope for providing transport support.

15. The method of claim 14, wherein a third rope is engaged with the first rope for pulling the container system in a first direction.

16. The system of claim 14, further comprising at least two latitudinal supports defined by each of the latitudinal sides and extending away from the base for providing latitudinal support.

17. The system of claim 16, wherein each of the latitudinal supports extends from an end of a respective runner, wherein each runner has two ends that each taper towards a latitudinal side.

18. The system of claim 14, further comprising a drain outlet for draining liquids from the tray.

19. The system of claim 14, wherein an edge of the longitudinal sides and the latitudinal sides located furthest from the base each defines a rounded rail for providing additional support.

20. The system of claim 14, wherein each of the latitudinal first holes and the latitudinal second holes is reinforced with a circular ring.

* * * * *